May 12, 1953  G. L. LARISON  2,638,357
COMPENSATING WHEEL MOUNTING
Filed Sept. 17, 1951  5 Sheets-Sheet 1
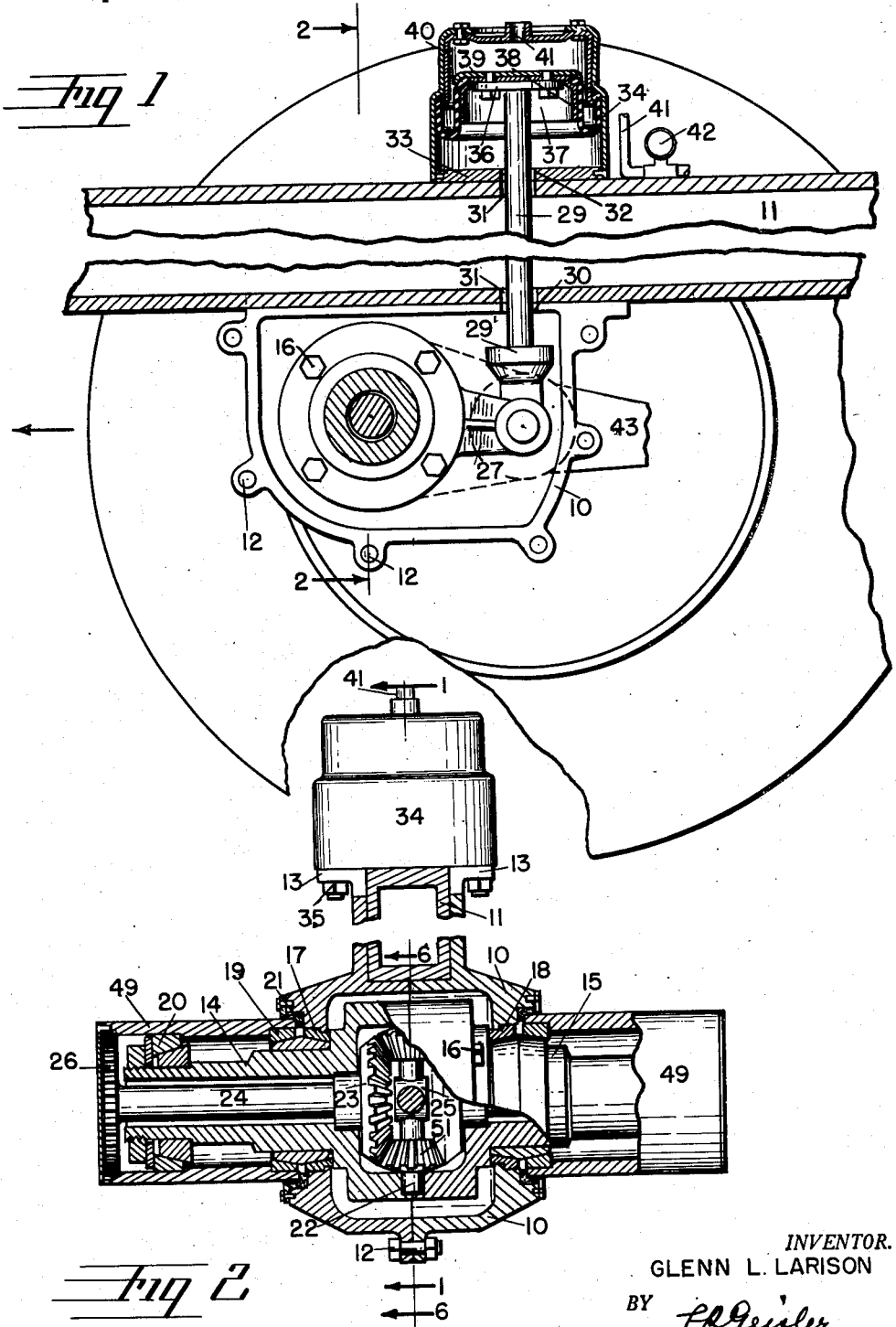
INVENTOR.
GLENN L. LARISON
BY
ATTORNEY

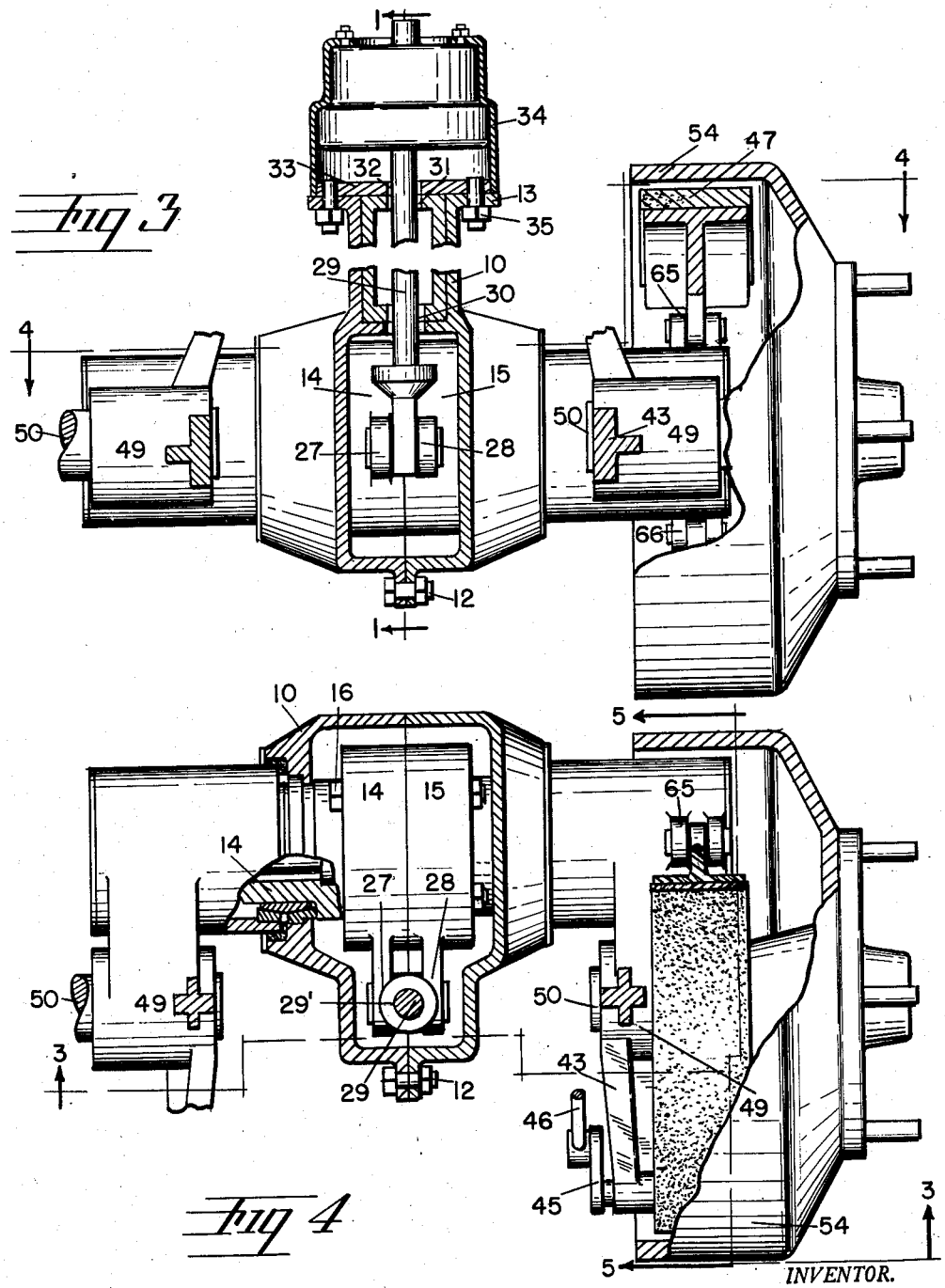

May 12, 1953 G. L. LARISON 2,638,357
COMPENSATING WHEEL MOUNTING
Filed Sept. 17, 1951 5 Sheets-Sheet 3

INVENTOR.
GLENN L. LARISON
BY
ATTORNEY

May 12, 1953 G. L. LARISON 2,638,357
COMPENSATING WHEEL MOUNTING
Filed Sept. 17, 1951 5 Sheets-Sheet 4

INVENTOR.
GLENN L. LARISON
BY
F. R. Geisler
ATTORNEY

May 12, 1953

G. L. LARISON 2,638,357

COMPENSATING WHEEL MOUNTING

Filed Sept. 17, 1951

INVENTOR.
GLENN L. LARISON
BY
*F. R. Geisler*
ATTORNEY

Patented May 12, 1953

2,638,357

UNITED STATES PATENT OFFICE 2,638,357

COMPENSATING WHEEL MOUNTING

Glenn L. Larison, La Grande, Oreg., assignor to Larison Compensating Axle Corporation, La Grande, Oreg., a corporation of Oregon Application September 17, 1951, Serial No. 246,997

3 Claims. (Cl. 280—104.5)

In general this application relates to vehicle wheel mountings of the so-called compensating type in which the wheels on each side of the vehicle are mounted and interconnected in pairs. The wheels in each pair are so mounted that they may move up and down in parallel planes, always remaining a constant spaced distance apart, and the compensating mechanism interconnects the two wheels of the pair in order that the load which they support will always be divided equally between them regardless of whether either wheel is raised higher than the other.

Various forms of compensating wheel mountings have been the subject of previous patents, and the present invention concerns more specifically a compensating axle suspension in which a common form of differential mechanism provides the compensating means between the two wheels of the pair. Somewhat similar compensating wheel mountings are described in my previous U. S. Letters Patent No. 2,401,766, issued June 11, 1946, entitled "Vehicle Suspension," and No. 2,417,206, issued March 11, 1947 entitled "Vehicle Wheel Suspension," to which previous patents reference is made.

An object of the present invention, similar to the objects in the inventions described in the above mentioned patents, is to provide compensating mounting for a pair of vehicle wheels which will not only compensate or divide the load equally between the wheels under all normal conditions but which at the same time will also enable the shocks which are transmitted to the vehicle from the wheels to be cushioned.

In the wheel suspensions described in the above mentioned prior patents, it is necessary to employ various spring means in order to cushion the shocks transmitted from the compensating wheels. A special object of the present invention, however, is to provide a cushioning and compensating wheel mounting in which the use of springs will be entirely eliminated, thus enabling the compensating wheel axle mountings to be simplified, to be more compact, and to enable certain novel features and advantages, hereinafter explained, to be obtained.

One of the recognized difficulties in connection with the use of springs for vehicles and in particular for trucks, trailers, and similar load-carrying vehicles, is that while the springs may be adapted or adjusted to serve as proper spring mounting and cushioning means for a definite amount of vehicle load, they may be quite unsuitable for a considerably different load or when the vehicle is traveling without any load. For example, the springs on a logging truck, adapted for heavy log loads, will be too stiff to afford adequate cushioning during the return trip of the unloaded truck, and undesirable bouncing of such an empty logging truck, when traveling over rough logging roads, is a common occurrence.

Another object of the present invention accordingly is to provide an improved cushioning and compensating wheel mounting which, while acting to compensate the load between a pair of connected wheel assemblies at all times, can be readily and quickly adjusted to produce the desired amount of cushioning or shock absorption to suit the particular conditions and particular load.

A related object is to provide an improved cushioning mounting in a compensating wheel assembly which is also capable of being used as a means for indicating or weighing the amount of vehicle load carried by the pair of wheels of the assembly.

A further object of the invention is to provide an improved and simplified cushioning and compensating wheel mounting which can be entirely enclosed in a relatively small housing, thus protecting the assembly from dirt and grit and simplifying the lubrication problem.

I attain the objects above indicated together with other advantages, by mounting the differential mechanism, through which the two wheel assemblies are connected, for limited rotation as an entire unit, and by employing simple and adjustable cushioning means to control the rotation of such differential mechanism as a unit, and in this way provide an adjustable shock-absorbing and load-cushioning vehicle suspension.

The general construction, the arrangement of the parts and the manner in which my improved compensating wheel mounting will function, will be readily understood from the following brief description with reference to the accompanying drawings:

In the drawings:

Fig. 1 is a sectional side elevation of a compensating wheel mounting embodying my invention, the same being shown attached to a main frame member located at one side of the vehicle frame, this section being taken on lines 1—1 of Figs. 2 and 3, with the brake mechanism in the far side wheel being omitted from the drawings;

Fig. 2 is an end elevation, partly in section, of the same compensating wheel mounting, with the two wheels entirely omitted from the view, the view being taken on line 2—2 of Fig. 1;

Fig. 3 is a transverse sectional elevation on line 3—3 of Fig. 4;

Fig. 4 is a plan view, partly in section, on line 4—4 of Fig. 3;

Figure 7:
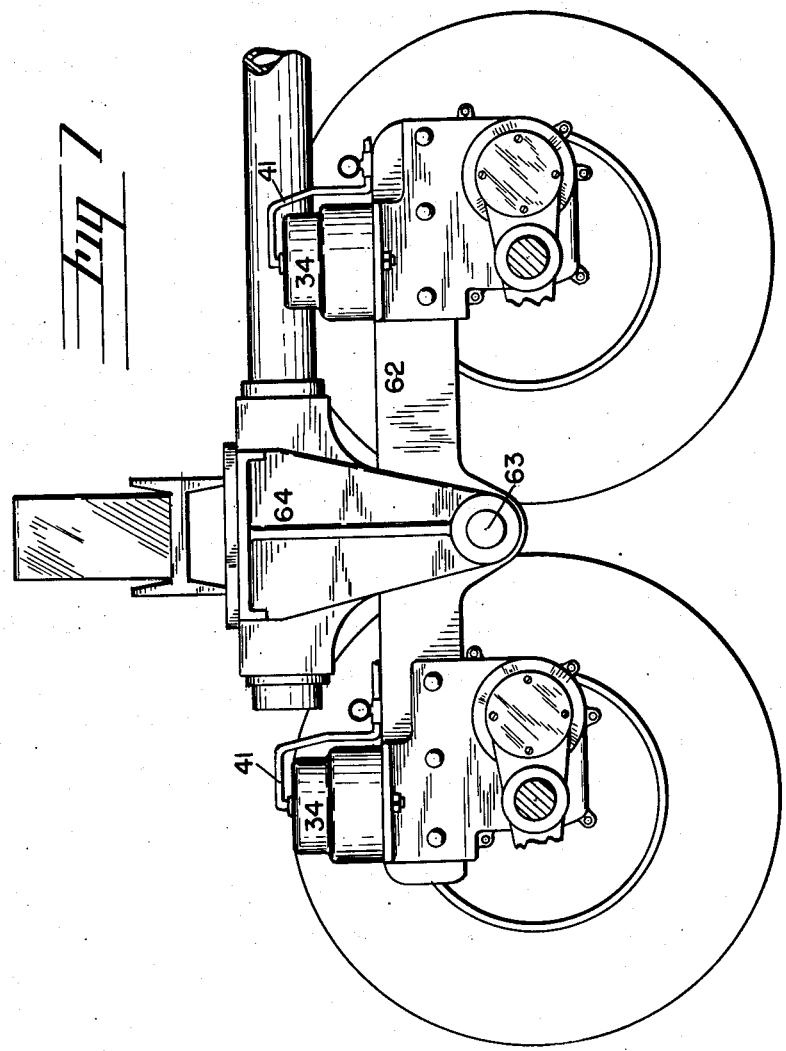
Figure 8:
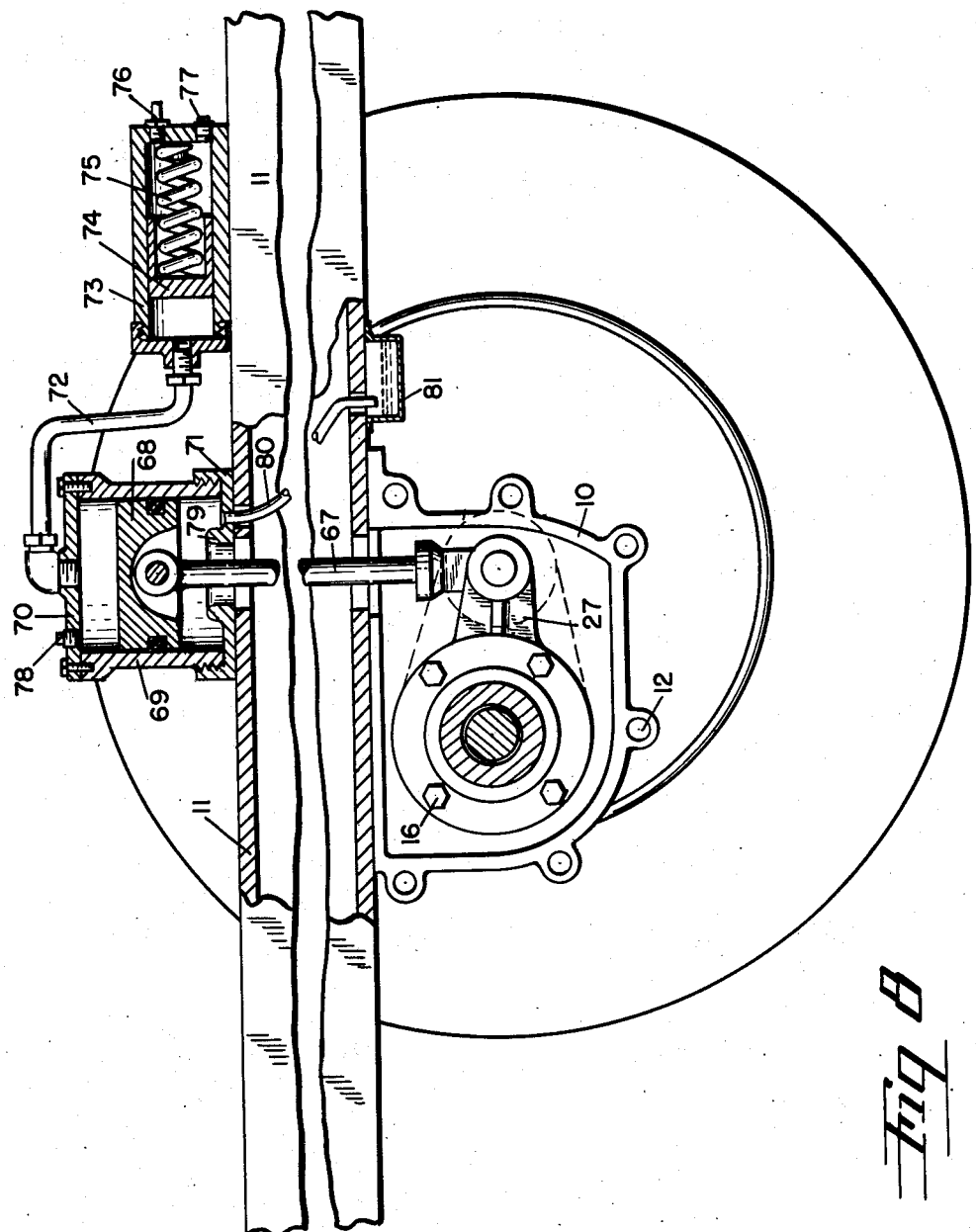

Fig. 7 is a side elevation of a vehicle having a walking beam on each side, with my compensating wheel mounting located at each end of the walking beam, the near side wheels of the vehicle being removed for the sake of clarity and the brake mechanism being omitted from the drawings also for the same reason; and Fig. 8 is a sectional side elevation, similar to Fig. 1 and showing a similar compensating wheel mounting but illustrating modified cushioning means, including a hydraulic cylinder, in place of the air cushioning means illustrated in the other figures.

A combined mounting bracket and housing 10, the general shape of which will be understood from Figs. 1 and 2, is rigidly attached to a main, longitudinally-extending vehicle frame member 11. The bracket housing 10 comprises a pair of companion half sections, secured together by bolts 12, and upper portions of the bracket housing sections extend around the sides of the vehicle frame member 11 and are rigidly secured thereto by bolts. The vehicle frame member 11 may be of any desired shape and construction but preferably is in the form of a box channel member commonly formed by the welding of two U-shaped channel members together, this form of frame member being indicated in Fig. 2. The bracket sections terminate at their top in outwardly-extending flanges 13 (Fig. 2) which are flush with the top face of the vehicle frame member 11, the purpose of these flanges being mentioned later.

A hollow, composite, rotatable supporting means (Fig. 2) comprising two identical sections 14 and 15 which are secured together by bolts 16, is rotatably mounted in the bracket housing 10. The bracket housing 10 has circular openings at each side to accommodate the elongated hubs of the sections 14 and 15 respectively and suitable bearings 17 and 18 between the sections 14 and 15 respectively and the adjacent portions of the housing bracket permit rotation of this composite rotatable supporting means with respect to the housing bracket 10.

A wheel-spindle-carrying arm 49 is rotatably journaled on each of the elongated hubs of the sections 14 and 15 and sealing rings 21 are interposed between the arms 49 and the adjacent surrounding flanges of the bracket housing 10 to prevent leakage of lubricant from the bracket housing. Suitable bearings 19 and 20 are provided for each spindle-carrying arm 49. A wheel-spindle 50 (Figs. 3 and 4) is secured to each spindle-carrying-arm 49.

Figure 6:
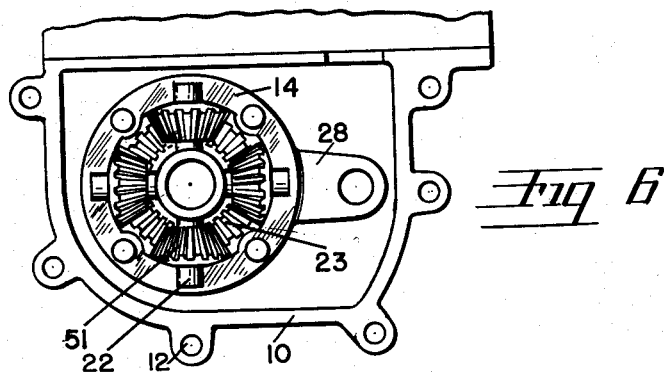
Fig. 6 is a sectional elevation on line 6—6 of Fig. 2.

Referring again to Fig. 2, a differential mechanism is located within the hollow composite rotatable supporting means formed by the two sections 14 and 15, and this differential mechanism includes a plurality of differential pinions 51 journaled on stub shafts 22 (see also Fig. 6), a pair of differential gears 23 meshing with the pinions 51 and a pair of shafts 24 secured to the gears 23 and extending through the elongated hubs of the sections 14 and 15.

The stub shafts 22 for the pinions 51 are secured between the sections 14 and 15 and are disposed about a common central support 25. The outer ends of the shafts 24 of the differential terminate in enlarged circumferential flanges 26 (Fig. 2). Teeth in the periphery of these flanges engage corresponding teeth in the wheel-spindle-carrying arms 49 so that the arms 49 are firmly connected with the shafts 24 respectively.

A pair of rigid arms 27 and 28 (Figs. 3 and 4) extend rearwardly from the enlarged inner portion of the sections 14 and 15 respectively of the spindle-arm supporting means and an upwardly-extending thrust rod 29 (see also Fig. 1) has its lower end pivotally connected to the arms 27 and 28. The thrust rod 29 extends up through an enlarged opening 30 in the bracket housing 10 thence through openings 31 in the bottom and top of the vehicle frame member 11 and through an opening 32 in a circular plate 33, and into a closed and substantially cylindrical housing 34 mounted above the frame member 11.

The housing 34 (Figs. 1 and 3) is secured to the plate 33 by suitable screws and the plate 33 is held in place on top of the vehicle frame member 11 by bolts 35 extending through the top flanges 13 of the bracket housing 10. The upper end of the thrust rod 29 is formed into a circular piston-like flange 36 (Fig. 1). The flange 36 carries an inverted cup-shaped member or cap 37. A strong flexible diaphragm 38, of rubber or similar suitable material, is secured on the cap 37 by a clamping plate 39. The outer perimeter of the diaphragm 38 is clamped against a shoulder on the inside of the housing 34 by the bottom rim of an inside clamping cup 40 which in turn is secured to the top of the housing 34 by suitable bolts. Thus the space within the housing 34 above the piston-like flange 36 of the thrust rod 29 and the diaphragm 38 and clamping plate 39 constitutes an air compression chamber in which the air offers resistance to the upward thrust of the rod 29 in proportion to the pressure of the sealed-in air.

An air supply pipe 41 (see also Fig. 5) leads from the air chamber in the top of the housing 34, and the outer end of this pipe 41 has a control valve (not shown) similar to a tire valve in order to enable the air pressure within the air chamber to be raised from an outside source of compressed air supply or to enable the pressure to be lowered, in the same manner as with a vehicle tire. If preferred, the air supply pipe can be connected up to an air pump operated by the vehicle motor, or to any source of compressed air carried by or available on the vehicle. Preferably an air gauge, indicated at 42, is mounted on the air pipe line 41.

The operation of the cushioning and compensating wheel mounting, as thus far described, will now be understood with reference to Figs. 1 to 4 inclusive. If one of the wheels, mounted on one of the spindles 50 is raised, as for example in passing over a bump on a road, the other wheel will be lowered a relatively corresponding amount as a result of the differential or compensating mechanism interconnecting the two wheel spindle arms. But if both wheels should be raised simultaneously, without raising the frame of the vehicle, the rotatable supporting means, comprising the sections 14 and 15 would have to be rotated slightly (counterclockwise as viewed in Fig. 1) causing the thrust rod 29 to move upwardly against the force of the compressed air in the chamber in the top of the housing 34. Thus if both vehicle wheels suddenly encountered a bump on the roadway during the travel of the vehicle the compressed air in the air chamber will cushion the shock and reduce the effect on the vehicle, and similarly if only one of the wheels strikes a bump in the roadway, the shock transmitted from the wheel to the vehicle will be cushioned by the air in the air chamber in addition to having the lifting effect on the vehicle produced by the raising of one wheel initially reduced by one-half by means of the differential mechanism.

Since the amount of cushioning or shock absorption will depend upon the extent of the upward movement or thrust of the rod 29, and this in turn will depend on the resulting relative increase in air pressure produced by such upward thrust, it will be apparent that the amount of cushioning for a given vehicle load weight carried by the two wheels of the assembly can be adjusted by adjusting the normal air pressure in the air compression chamber. In other words, if a heavy load is being carried by the vehicle the normal air pressure must be increased in the air chamber to withstand the normal upward thrust on the rod 29 and allow for sufficient upward movement when shocks are transmitted from the wheels. On the other hand, when the same vehicle is traveling with a much lighter load, the normal air pressure in the air chamber should be reduced to permit proper shock absorption. Thus by the simple expedient of raising or lowering the normal air pressure in the air compression chamber (which can be accomplished as easily and expeditiously as adjusting the air pressure in a vehicle wheel tire), the same vehicle can be adjusted to accommodate different loads. In this way a vehicle could be used for hauling a heavy freight load to a destination and then quickly adjusted to enable a delicate or perishable load of merchandise to be efficiently hauled by the same vehicle on its return trip.

The attaching of a simple air pressure gauge to the air supply line, to indicate the air pressure within the air chamber, not only will facilitate the adjusting of the air pressure to conform to a predetermined amount for a particular load and for particular hauling conditions, but such air gauge, by showing the differences in air pressure for the unloaded vehicle and for the vehicle when loaded, can serve as a means for measuring the load carried by the pair of connected wheels. The total load weight would then be merely the sum of the loads carried by the separate pairs of compensating wheel mountings.

Preferably the thrust rod 29 (Fig. 1) has a bottom portion of enlarged diameter presenting a shoulder 29' of greater diameter than that of the opening 30 in the upper portion of the housing 10. This shoulder 29' acts as a definite limit to the upward movement of the thrust rod 29 in the event of failure of the air chamber in the top of the housing 34 for any reason to check the upward movement of the thrust rod 29. The compensating wheel mounting would thus continue to function in such emergency and to divide the load between the two wheels even though the housing 34 and air chamber were completely obliterated, but there would then of course be no cushioning of the shocks received from the wheels.

Figure 5:
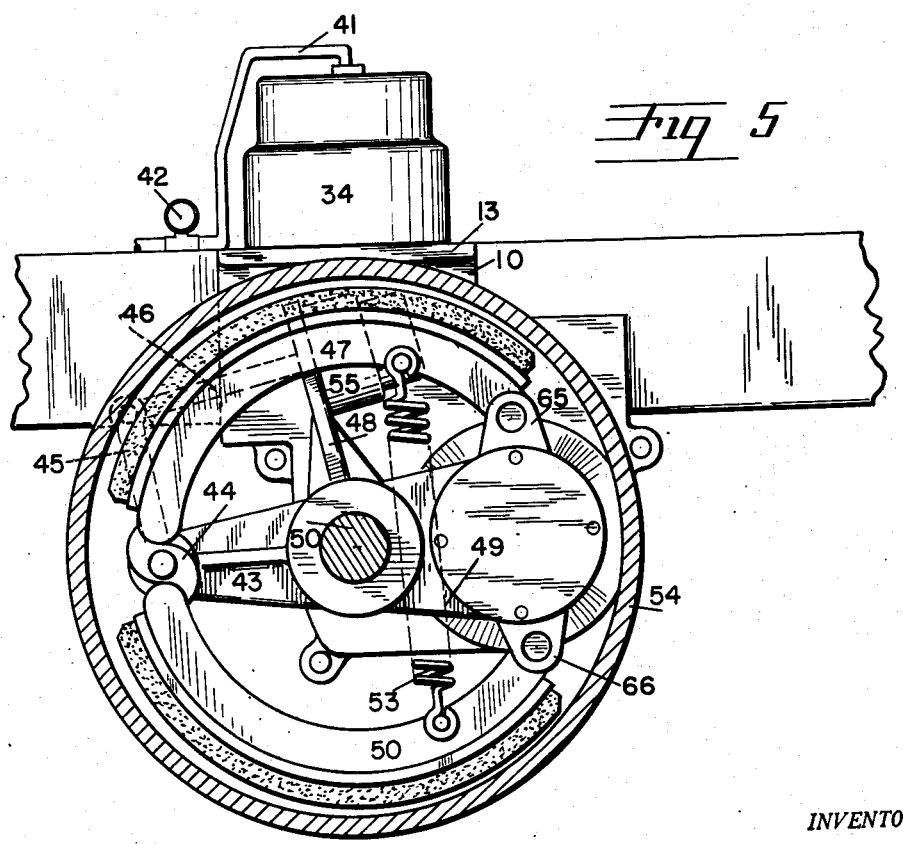
Fig. 5 is a sectional side elevation on line 5—5 of Fig. 4 showing also the brake drum and braking mechanism for the far side wheel of Fig. 1.

The compact compensating and cushioning mounting thus far illustrated and described allows ample room for the usual brake mechanism within the brake drums of the individual wheels and the spindle-carrying arms 49 can be made to provide convenient and advantageous supporting means for the brake mechanism. Figs. 3, 4 and 5 illustrate the manner in which such brake mechanism may be mounted on each spindle-carrying arm within the brake drum of each wheel of the pair in the assembly. In these figures the brake drum is shown at 54, the wheel itself being omitted for clarity.

The spindle-carrying arm 49 is formed with an integral bracket extension 43 and with pairs of diametrically opposite ears 65 and 66 extending in the relative position shown in Fig. 5. A pair of brake shoes 47 and 50 are hinged at one end to the pairs of ears 65 and 66 respectively. At their other ends the brake shoes are engaged by a brake cam 44 which is rotatably supported in the end of the bracket extension 43. The customary lever arm 45 is attached to the rotatable cam element 44 and a link 46 is operated by a piston in the brake air cylinder 55. The air cylinder 55 is carried on another arm 48 extending from the spindle-carrying arm 49. The two brake shoes 47 and 50 are connected by the customary spring 53 extending across the outside face of the spindle-carrying arm 49.

Thus far my invention has been described with reference to a vehicle having only a single pair of compensating wheels on each side, corresponding to a common single-axle trailer or to the common so-called single-axle truck. However, with larger vehicles, both trailer and trucks, it is customary to use a so-called dual axle vehicle suspension in which the vehicle frame is supported on a walking beam at each side and the walking beams in turn are supported on the dual axles and sets of wheels at their respective ends. My improved compensating wheel mounting is just as suitable for use with a dual axle suspension as with a single-axle suspension and in fact can even be used interchangeably for both types inasmuch as the same mounting can be employed on a walking beam in exactly the same manner as when the mounting is attached directly to the main vehicle frame.

Fig. 7 illustrates a vehicle of the dual axle, walking beam type, the vehicle illustrated being a dual axle logging trailer. The vehicle frame includes frame brackets 64 carrying a transversely-extending trunnion shaft 63 on which a walking beam 62 is mounted on each side. At each end of the walking beam a pair of wheel carrying arms are mounted through the intermediary of my compensating and cushioning wheel mounting. Thus it will be noted from Fig. 7 that the compensating wheel mounting at each end of the walking beam 62 as shown is exactly the same as the compensating wheel mounting attached directly to the vehicle frame member 11 in Fig. 1. Assuming that the cross sectional shape and size of the walking beam 62 near its ends is the same as that of the main frame member 11 of the vehicle in Fig. 1, the same bracket housing 10 previously described, can be employed by attaching the compensating mechanism at each end of the walking beam and the same housing 34 and air chamber with associated parts are mounted on each end of the walking beam 62. An air supply pipe 41, as previously described, preferably having a gauge 42 connected therewith, is connected to the air chamber and is supplied with a suitable valve (not shown) so that the air pressure in the air chamber can be raised or lowered as required, as previously described.

Thus the load at each end of the walking beam is divided between the two wheels of the pair, and the shocks transmitted from the wheels to the walking beam are cushioned in the manner previously described. In other words, the load at one side of the vehicle, carried by the walking beam, is divided equally among four wheels while the shocks transmitted from any or all of the four wheels are cushioned.

In the modified form of the means for cushioning and controlling the rotation of the compensating mechanism as an entire unit illustrated in Fig. 8, the thrust rod 67 has its upper end connected to a hydraulic piston 68 which is movable up and down in a cylindrical housing formed by the cylindrical wall 69, top plate 70 and bottom plate 71. The bottom plate 71 is secured in place on the top of the mounting bracket 10 and vehicle frame member 11 in the same manner as the bottom plate 33 of Fig. 3 and has a peripheral flange to which the cylindrical wall 69 is secured. The top plate 70 is secured to the top of the cylindrical wall 69 by suitable screws as shown in Fig. 8.

The space within the cylindrical housing above the hydraulic piston 68 is filled with hydraulic fluid and thus becomes a hydraulic cylinder for the piston. A pipe 72 connects the top of the hydraulic cylinder with the end of a second cylinder 73, secured on the frame member 11. A cushioning piston 74 is mounted in the cylinder 73, the cushioning means being supplied by both a coil spring 75 and by compressed air on the spring side of the piston 74. The compressed air is delivered through the port 76 which is closed by a suitable air pressure valve. A drain plug 77 is provided for occasionally draining off any of the hydraulic fluid which may seep through to the air side of piston 74. Hydraulic fluid is supplied to the device through a port 78. The bottom plate 71 has a central opening for the thrust rod 67 which is surrounded by a slightly raised wall 79 so as to prevent any hydraulic fluid which may leak down past the piston 68 from passing down into the bracket housing 10, and a drain 80 allows any hydraulic fluid collecting on the bottom plate 71 to drain down into a suitable collecting vessel 81.

As evident, the thrust rod 67 and hydraulic piston 68, due to the hydraulic connection with the cushioning piston 74, act in a manner similar to that previously described in controlling and cushioning the rotation of the compensating mechanism as an entire unit.

Various other modifications and minor changes would be possible in the compensating cushioning wheel mounting which I have illustrated and described without departing from the principle of my invention. It is not my intention to restrict my compensating wheel mounting assembly to any specific construction or to limit my invention otherwise than as set forth in the claims.

I claim:

1. In a vehicle suspension, a frame member, a housing attached to and extending below said frame member, a differential mechanism carried in said housing for rotational movement as an entire unit on a substantially horizontal axis, a pair of wheel-spindle arms mounted on opposite sides of said housing respectively on the same horizontal axis as said differential mechanism and connected to said differential mechanism, said differential mechanism so arranged that upward movement of one wheel-spindle arm will cause relative opposite movement of the other wheel-spindle arm and upward movement of both wheel-spindle arms will cause rotational movement of said differential mechanism as an entire unit, enclosed means controlling the rotation of said differential mechanism as an entire unit, said means including a thrust rod, the lower portion of said thrust rod located within said housing, said rod extending upwardly from said housing and through said frame member and movable up and down through said frame member, means connecting the bottom end of said thrust rod with said differential mechanism and so arranged that upward movement of both wheel-spindle arms and consequent rotation of said differential mechanism as an entire unit will cause upward movement of said thrust rod, and adjustable air cushioning means mounted on said frame member above said housing for controlling the upward movement of said thrust rod and thereby cushioning the shocks transmitted to said frame member and vehicle suspension through said wheel-spindle arms and differential mechanism.

2. In a vehicle suspension, a longitudinally-extending frame member, a housing bracket attached to said frame member, a supporting means mounted in said housing bracket for rotational movement on a horizontal axis, openings in the sides of said housing bracket, said supporting means extending in lateral directions beyond said openings, a differential mechanism carried by said supporting means in said housing bracket, a pair of wheel-spindle arms mounted at opposite sides of said housing bracket on said supporting means on the same horizontal axis as said supporting means and said differential mechanism and connected to said differential mechanism, said differential mechanism and said supporting means so connected and arranged that upward movement of one wheel-spindle arm and upward movement of both wheel-spindle arms will cause rotational movement of said supporting means, a rigid arm secured to said supporting means within said housing bracket and extending substantially in the same direction as said wheel-spindle arms, a thrust rod in said housing bracket pivotally connected to said rigid arm and extending upwardly in and from the housing bracket and through said frame member and actuated by the rotation of said supporting means, means limiting the upward movement of said thrust rod, and adjustable air cushioning means mounted on said frame member above said housing bracket for controlling the upward movement of the thrust rod and thereby cushioning the shocks transmitted to said frame member and to the vehicle suspension through wheel-spindle arms and differential mechanism.

3. In a vehicle suspension, a longitudinally-extending walking beam, a housing bracket attached to each end of said walking beam, a supporting means mounted in each of said housing brackets for rotational movement on a horizontal axis, openings in the sides of each of said housing brackets, said supporting means extending in lateral directions beyond said openings, a differential mechanism carried by said supporting means in each of said housing brackets, a pair of wheel-spindle arms mounted at opposite sides of each of said housing brackets respectively on said supporting means on the same horizontal axis as said supporting means and said differential mechanism and connected to said differential mechanism, said differential mechanism and said supporting means in each housing bracket so connected and arranged that upward movement of one wheel-spindle arm will cause relative opposite movement of the other wheel-spindle arm and upward movement of both wheel-spindle arms will cause rotational movement of the corresponding supporting means, a rigid arm secured to said supporting means within each of said housing brackets and extending substantially in the same direction as said wheel-spindle arms, a thrust rod in each of said housing brackets pivotally connected to said rigid arm and extending upwardly in and from the housing bracket and through said walking beam and actuated by the rotation of said supporting means, and adjustable air cushioning means mounted on said walking beam above each of said housing brackets for controlling the upward movement of each thrust rod and thereby cushioning the shocks transmitted to each end of said walking beam and to the vehicle suspension through the wheel-spindle arms and differential mechanism.

GLENN L. LARISON.

References Cited in the file of this patent

UNITED STATES PATENTS

| Number | Name | Date |
|---|---|---|
| 1,745,432 | Marcum | Feb. 4, 1930 |
| 1,929,857 | Strauss | Oct. 10, 1933 |
| 2,411,885 | Larison | Dec. 3, 1946 |